United States Patent Office 3,083,226
Patented Mar. 26, 1963

3,083,226
N-BENZYL CYCLOPROPYLAMINES AND CARBAMATES
Bruce Wayne Horrom and William Brady Martin, Waukegan, Ill., assignors to Abbott Laboratories, North Chicago, Ill., a corporation of Illinois
No Drawing. Filed Oct. 18, 1961, Ser. No. 145,996
8 Claims. (Cl. 260—471)

This invention relates to novel cyclopropylamines corresponding to the formula

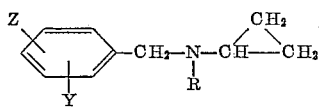

in this and succeeding formulas, R represents hydrogen, methyl or ethoxycarbonyl, and Z and Y each represent hydrogen, chlorine or bromine. These new compounds are colorless liquids which are somewhat soluble in common organic solvents but substantially insoluble in water. They are useful as monoamine oxidase inhibitors and as such can be employed to improve or eliminate the annoying symptoms of depression. In a representative operation, complete inhibition of monoamine oxidase was obtained in mice when N-benzyl-N-cyclopropylurethan was administered orally at a dosage of 25 mg. per kg. of body weight.

The compounds can be readily prepared as illustrated in the following series of reactions:

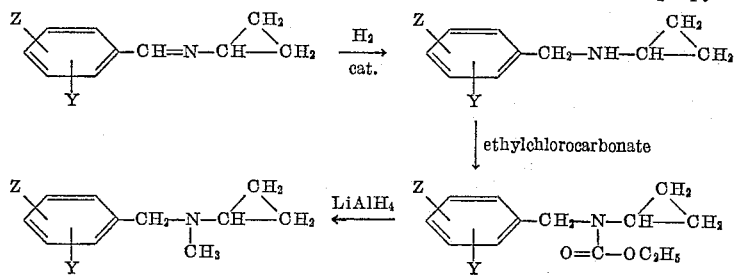

In carrying out these reactions, N-benzylidenecyclopropylamine or a halogen substituted derivative thereof is dissolved in a suitable solvent, preferably absolute alcohol, and treated with hydrogen at room temperature in the presence of a palladium catalyst, such as 5% palladium on charcoal, until the uptake of hydrogen is complete. The reaction mixture is then filtered, the filtrate concentrated and the residue fractionally distilled to obtain the desired N-benzylcyclopropylamine or halogen substituted derivative thereof as a colorless liquid. This product is thereafter reacted with an equimolar proporportion of ethyl chlorocarbonate in dry ether and in the presence of a hydrogen chloride acceptor such as triethylamine. The reaction is somewhat exothermic and cooling is required to keep the reaction under control. When the reaction is complete, the reaction mixture is filtered, the filtrate concentrated and the residue fractionally distilled to obtain the resulting N-benzyl-N-cyclopropylurethan or halogen substituted derivative thereof as a colorless liquid. In the final step of the reaction, N-benzyl-N-cyclopropylurethan or halogen substituted derivative thereof is reacted with lithium aluminum hydride in a suitable solvent such as dry ether at the boiling temperature and under reflux until the reaction is complete. The reaction mixture is then decomposed with water, filtered, the filtrate concentrated and the residue distilled under reduced pressure to obtain the desired N-benzyl-N-methylcyclopropylamine or halogen substituted derivative thereof as a colorless oil.

The following examples illustrate the invention in more detail but are not to be considered as limiting the same to the specific amounts of reactants and procedures employed to isolate the desired products.

EXAMPLE 1

N-Benxylcyclopropylamine

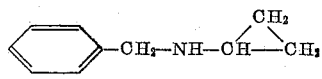

A solution of 29 grams (0.2 mole) of N-benzylidenecyclopropylamine in 50 ml. of absolute alcohol was hydrogenated at room temperature at a hydrogen pressure of 30 p.s.i. in the presence of 1.45 grams of a 5% palladium-charcoal catalyst. The uptake of hydrogen was complete in 30 minutes. The reaction mixture was filtered, the filtrate concentrated and the residual oil distilled under reduced pressure to obtain the desired N-benzylcyclopropylamine as a colorless oil boiling at 80°–81° C. at 5 mm. pressure. $n_D^{25}=1.5222$. The product contained 9.73% nitrogen compared to the calculated value of 9.52% nitrogen.

EXAMPLE 2

N-Benzyl-N-Cyclopropylurethan

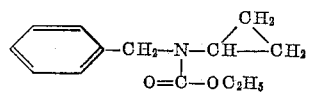

To a mixture of 15 grams (0.1 mole) of N-benzylcyclopropylamine and 10.3 grams (0.1 mole) of triethylamine in 200 ml. of dry ether was added dropwise with cooling and stirring 11.07 grams (0.1 mole) of ethyl chlorocarbonate in 100 ml. of dry ether. The reaction mixture was stirred overnight and thereafter filtered to remove the triethylamine hydrochloride. The filtrate was concentrated and the residual oil distilled under reduced pressure to obtain the desired N-benzyl-N-cyclopropylurethan as a colorless oil boiling at 90°–92° C. at 0.08 mm. pressure. $n_D^{27}=1.5085$. The product contained 6.52% nitrogen compared to the calculated value of 6.39% nitrogen.

EXAMPLE 3

N-Benzyl-N-Methylcyclopropylamine

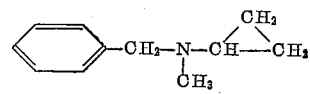

To a suspension of 1.8 grams (0.048 mole) of lithium aluminum hydride in 150 ml. of dry ether was added slowly with stirring 14.6 grams (0.06 mole) of N-benzyl-N-cyclopropylurethan in 100 ml. of dry ether at such a rate as to maintain gentle reflux. Stirring was thereafter continued for 1½ hours. The resulting complex was then decomposed by the cautious, successive addition of 1.7 ml. of water, 1.7 ml. of 15% aqueous sodium hydroxide and 5.1 ml. of water. After filtering, the filtrate was concentrated and the residual oil distilled under reduced pressure to obtain the desired N-benzyl-N-methyl-cyclopropylamine as a colorless oil boiling at 56°–57°

C. at 4 mm. pressure. $n_D^{25}=1.5061$. The product contained 10.86% nitrogen which corresponds to the calculated value.

EXAMPLE 4

By substituting N-o-bromobenzylidenecyclopropylamine, N-p-chlorobenzylidenecyclopropylamine or N-3,4-dichlorobenzylidenecyclopropylamine for the N-benzylidenecyclopropylamine of Example 1, there is obtained respectively N-o-bromobenzylcyclopropylamine boiling at 110° C. at 3.5 mm. pressure, N-p-chlorobenzylcyclopropylamine boiling at 78° C. at 0.1 mm. pressure and N-3,4-dichlorobenzylcyclopropyl amine boiling at 98° C. at 0.8 mm. pressure.

In like manner other N-halobenzylidenecyclopropylamines can be substituted as starting materials in Example 1 of which the following are representative:

N-p-bromobenzylidenecyclopropylamine
N-m-bromobenzylidenecyclopropylamine
N-o-chlorobenzylidenecyclopropylamine
N-m-chlorobenzylidenecyclopropylamine
N-3,4-dibromobenzylidenecyclopropylamine
N-2,4-dibromobenzylcyclopropylamine
N-3,5-dibromobenzylidenecyclopropylamine
N-2,6-dibromobenzylidenecyclopropylamine
N-2,4-dichlorobenzylidenecyclopropylamine
N-3,5-dichlorobenzylidenecyclopropylamine
N-2,6-dichlorobenzylidenecyclopropylamine

EXAMPLE 5

The reaction of equimolecular proportions of N-o-bromobenzylcyclopropylamine, N-p-chlorobenzylcyclopropylamine or N-3,4-dichlorobenzylcyclopropylamine with ethyl chlorocarbonate as described in Example 2 results in the formation respectively of N-o-bromobenzyl-N-cyclopropylurethan boiling at 132° C. at 0.6 mm. pressure and N-3,4-dichlorobenzyl-N-cyclopropylurethan boiling at 137° C. at 0.6 mm. pressure.

If desired, any of the following compounds can be substituted as a starting material in the foregoing reaction:

N-p-bromobenzylcyclopropylamine
N-m-bromobenzylcyclopropylamine
N-o-chlorobenzylcyclopropylamine
N-m-chlorobenzylcyclopropylamine
N-3,4-dibromobenzylcyclopropylamine
N-2,4-dibromobenzylcyclopropylamine
N-3,5-dibromobenzylcyclopropylamine
N-2,6-dibromobenzylcyclopropylamine
N-2,4-dichlorobenzylcyclopropylamine
N-3,5-dichlorobenzylcyclopropylamine
N-2,6-dichlorobenzylcyclopropylamine

EXAMPLE 6

When any of the urethans prepared in Example 5 are reduced with lithium aluminum hydride as described in Example 3, there is readily obtained the corresponding N-halobenzyl-N-methylcyclopropylamines.

N-benzylidenecyclopropylamine employed as one of the starting materials in the present invention can be conveniently prepared by adding dropwise with stirring and cooling one molecular proportion of cyclopropylamine to one molecular proportion of freshly distilled benzaldehyde. Stirring is thereafter continued at room temperature for 1.5 hours. About 500 ml. of ether is then added and the ether layer is separated, dried and filtered. The filtrate is concentrated and the oily residue fractionally distilled under reduced pressure to obtain the desired product as a colorless liquid boiling at 84°–85° C. at 5 mm. pressure and having a refractive index $n/D$ of 1.5728 at 25° C.

The reaction of a halogen substituted benzaldehyde with cyclopropylamine under the same conditions described above will produce the corresponding N-halobenzylidenecyclopropylamines. Thus, N-o-bromobenzylidenecyclopropylamine boils at 112° C. at 2.8 mm. pressure whereas N-p-chlorobenzylidenecyclopropylamine boils at 125° C. at 8.5 mm. pressure and N-3,4-dichlorobenzylidenecyclopropylamine melts at 43°–45° C.

This application is a continuation-in-part of our copending application U.S. Serial No. 847,980, filed October 22, 1959, now abandoned.

What we claim is:

1. A compound of the formula

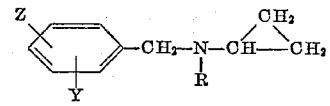

wherein R is ethoxycarbonyl and Z and Y are selected from the group consisting of hydrogen, chlorine and bromine.

2. N-benzyl-N-cyclopropylurethan.
3. N-o-bromobenzylcyclopropylamine.
4. N-p-chlorobenzylcyclopropylamine.
5. N-3,4-dichlorobenzylcyclopropylamine.
6. N-o-bromobenzyl-N-cyclopropylurethan.
7. N-p-chlorobenzyl-N-cyclopropylurethan.
8. N-3,4-dichlorobenzyl-N-cyclopropylurethan.

References Cited in the file of this patent

Braun et al.: Ann. der Chemie, vol. 445, 212–3 (1925).